United States Patent [19]

Chapman et al.

[11] 4,217,695

[45] Aug. 19, 1980

[54] HAIR LENGTH MEASURING APPARATUS

[76] Inventors: Bruce H. Chapman, 6444 Garrone Ave., Newark, Calif. 94560; James E. Oliver, 475 Magnolia, Half Moon Bay, Calif. 94019; Lawrence L. Talarico, 1013 Via Palma, San Lorenzo, Calif. 94580

[21] Appl. No.: 925,303

[22] Filed: Jul. 17, 1978

[51] Int. Cl.² ............................ G01B 7/02; G01B 3/12
[52] U.S. Cl. .............................. 33/134 R; 33/141 R; 33/DIG. 3; 132/9
[58] Field of Search ............... 132/9, 46; 33/125 A, 33/129, 134 R, 141 R, 141 E, 174 D, DIG. 3; 250/233

[56] References Cited

U.S. PATENT DOCUMENTS

| | | | |
|---|---|---|---|
| 502,943 | 8/1893 | Wren et al. | 33/134 R |
| 1,455,795 | 5/1923 | Logan | 250/233 |
| 1,589,184 | 6/1926 | Levy | 33/134 R |
| 3,497,959 | 3/1970 | Engelsman | 33/141 R |
| 3,780,297 | 12/1973 | Geary | 250/233 |
| 3,916,174 | 12/1975 | Moule | 33/129 |

FOREIGN PATENT DOCUMENTS

| | | | |
|---|---|---|---|
| 476019 | 5/1929 | Fed. Rep. of Germany | 33/129 |
| 96488 | 10/1922 | Switzerland | 33/129 |
| 119509 | 8/1927 | Switzerland | 33/129 |

*Primary Examiner*—Richard R. Stearns
*Attorney, Agent, or Firm*—Fitch, Even & Tabin

[57] ABSTRACT

A hair length measuring apparatus includes a measuring roller and holding clamp operatively mounted on a handle, said holding clamp holding against said roller the hair being measured, such that as said handle is moved along the length of said hair, said roller is caused to rotate thereby. An optical switch detects the rotation of said roller, a decimal counter counts said rotating, and a display displays the state of said counter, thereby providing a continuously updated indication of the length of hair that has traveled across said roller during a given hair measuring operation.

9 Claims, 6 Drawing Figures

U.S. Patent   Aug. 19, 1980   Sheet 1 of 2   4,217,695
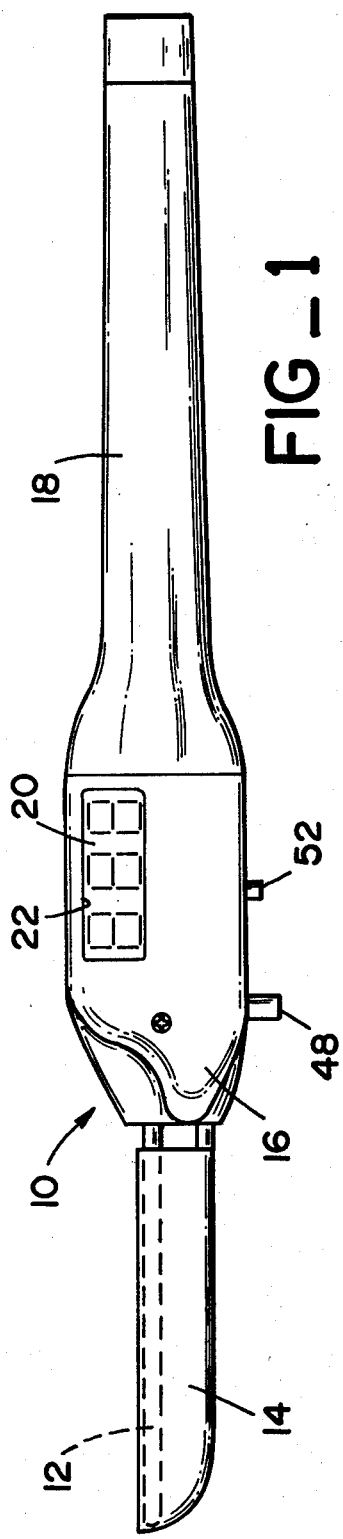
FIG_1
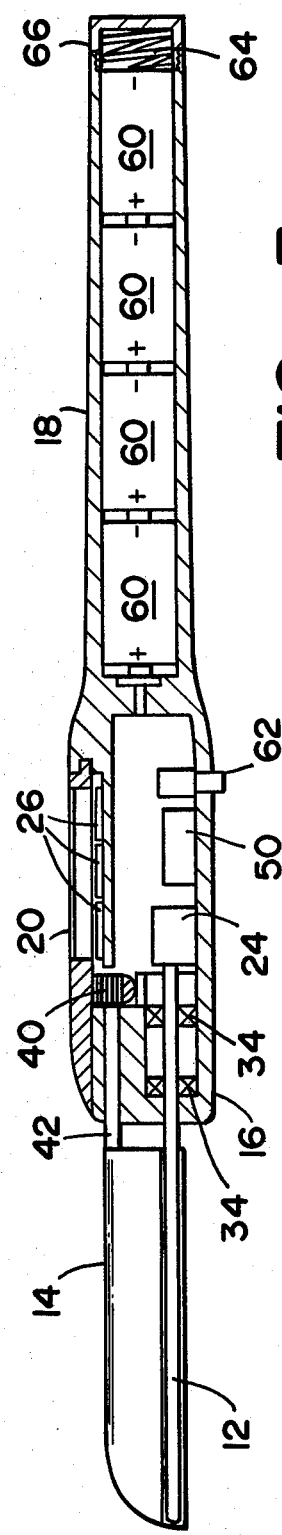
FIG_3
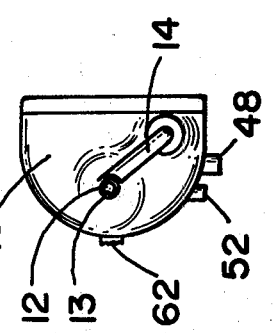
FIG_2

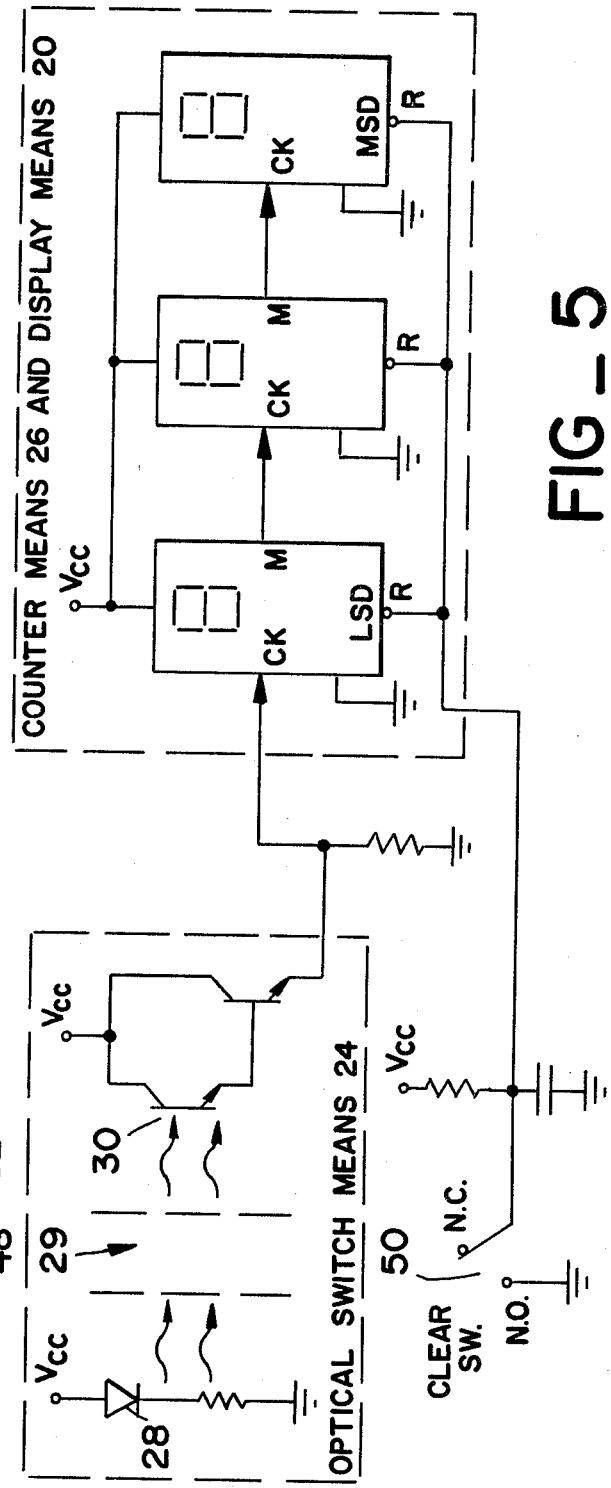
FIG_4A
FIG_4
FIG_5

HAIR LENGTH MEASURING APPARATUS

BACKGROUND OF THE INVENTION

Hair stylists and barbers have for a long time had the problem of cutting a person's hair evenly such that the length of the hair on both sides of the person's head is equal. In the prior art, the hair stylists could only guess where, on a specific section of hair, a cut should be made to enable that cut to correspond to a cut already made on the other side of the person's head. For example, one method of checking whether the hair on each side is of an equal length was to merely pull sections of the hair from both sides of the head around to a reference point on the head, such as the nose of the person, and again estimating simply with the eye whether or not the hairs are of the same length.

SUMMARY OF THE INVENTION

The hair length measuring apparatus of the present invention provides a simple, easy means for accurately measuring the length of hair at a given section on a person's head, thereby avoiding any of the above described cumbersome and inaccurate prior art methods of determining hair length. The present invention enables hair to be operatively positioned against a roller, such that as the roller is drawn away from the scalp along a path of the hair, the hair causes the roller to rotate. This roller rotation is sensed, and count pulses are generated thereby and are coupled to a decimal counter. Operatively attached to the counter is a display having a plurality of decimal digits, for continually displaying the present count as the roller rotates along the length of the hair. Thus, when the hair length count on one side of a person's head is 25, for example, hair located on the opposite side of the head is cut to the same length by positioning the roller at the scalp and drawing the hair through the apparatus until the counter indicates the same number. Cutting the hair at this point will thereby provide hair of the same length on each side.

In the present embodiment, the measuring roller, optical switch, counter means, and display means are operatively mounted on a handle, to facilitate the portability of the apparatus of the present invention.

Therefore, a principal object of the invention is to provide a measuring apparatus for hair length which is both easy to use and portable, such that hair length can be easily read out therefrom.

Another object of the present invention is to provide a hair length-measuring apparatus wherein state-of-the-art microcircuits are used to further facilitate the packaging of the components of the present invention in a small area.

A further object of the present invention is to provide a hair length-measuring apparatus which may be powered by batteries also contained in the handle of the apparatus.

These and other objects and advantages of the present invention will become clear upon reference to the accompanying drawings and following description.

BRIEF DESCRIPTION OF THE DRAWINGS

FIG. 1 is a front plan view of the hair length measuring apparatus of the present invention.

FIG. 2 is an end view of the apparatus shown in FIG. 1;

FIG. 3 is a cut-away bottom view of the apparatus shown in FIG. 1, illustrating details of battery and component placement;

FIG. 4 is a cut-away side view of the apparatus shown in FIG. 1;

FIG. 4A is a detailed view of the rack and pinion gear used for modifying the position of the holding clamp shown in FIG. 4; and FIG. 5 is a partial schematic and block diagram of the circuitry of the optical switch, counter, and display means of the present invention.

DESCRIPTION OF A PREFERRED EMBODIMENT

A front plan view of the hair length measuring apparatus of the present invention is shown at 10 in FIG. 1. The apparatus 10 includes a measuring roller, shown in phantom at 12, positioned behind a holding clamp 14. Both the measuring roller 12 and the holding clamp 14 are operatively attached to a body portion 16, including a handle 18. Also shown in FIG. 1 is the display means 20 of the present invention, viewable through an aperture 22 in the body portion 16.

FIG. 2 is an end view of the apparatus shown in FIG. 1, illustrating in greater detail the positioning of the measuring roller 12 with respect to the holding clamp 14. As also seen in FIG. 2, the roller 12 includes a coating of rubber or the like, shown at 13, to increase the frictional contact of the hair against said roller 12, to facilitate hair engagement with roller 12, and thereby cause roller 12 to rotate as the hair is drawn over it.

As seen in FIG. 3, the hair length measuring apparatus further includes means for sensing the rotation of the measuring roller 12. In the present embodiment, this means is provided by an optical switch means 24, such as a Monsanto MCA81 optical switch. The optical switch means 24 generates output electrical signals in response to the periodic interruption of light transmission during the rotation of said roller 12. This signal is coupled to a counter means 26, which counts the number of times said electrical signal is produced. The present count in said counter means 26 is continuously coupled to display means 20 for displaying thereof.

FIG. 4 illustrates a cut-away side view of the apparatus shown in FIG. 1. As seen in this view, in one embodiment the optical switch 24 comprises a U-shaped member including means for transmitting light across the air gap 29 between the legs of said U-shaped member to a detector. In this embodiment, the light transmitter is a standard LED 28, and a standard detector 30 on the opposite side of the air gap 29 is positioned to detect said transmitter's light. The roller is defined in a position such that it will rotate within said air gap 29 along an axis perpendicular to the path of said light. The roller is further defined to include at least one hole 32 in a position such that as said roller rotates in said air gap 29, the transmitted light generated by LED 28 is caused to be interrupted or blocked from reaching said detector 30 at all times except when it is enabled to pass through said hole 32.

Note that if more than one light path were provided through roller 12, i.e., additional holes 32, a number of counts would be generated for each 360° rotation of roller 12. Note also that the rotation of roller 12 is facilitated with respect to said body portion 16 by means of a plurality of bearings 34 positioned along the roller 12 as shown in FIGS. 3 and 4.

In an alternate embodiment, a disc having alternate transparent and non-transparent sections could be attached to said roller 12, for rotation therewith. A light path positioned parallel to the axis of rotation of said roller such that it would be interrupted by said non-transparent sections would provide another conventional indication of roller 12 rotation.

In operation, the roller 12 is caused to rotate by the action of hair moving across said roller 12 as the body portion 16 and handle 18 of the present invention are drawn away from the scalp of the person whose hair is being measured. The holding clamp 14 provides the means for holding hair against said roller during the measuring operation. Means are further provided for modifying the position of said holding clamp to enable hair to be measured to be initially positioned between clamp 14 and roller 12. In the present invention, as seen in FIG. 4, said means comprises a pinion gear 40 operatively attached to the holding clamp 14 by means of rod 42, and a rack 44 seated in a shaft 45 defined in body portion 16. A spring member 46 is provided to bias said rack 44 such that the holding clamp is in tension in its normal state against said roller 12.

To move the holding clamp 14 off of measuring roller 12, the head 48 of rack 44 is manually pressed, causing rack 44 to move in a direction perpendicular to rod 42, thereby causing rod 42 to rotate via pinion gear 40. The spring 46 is also compressed by this operation. Rotating rod 42 causes the holding clamp 14 to move off of the roller 12, thereby allowing hair to be measured to be initially positioned between said clamp 14 and said roller 12. Upon releasing the manual pressure on the head 48 of the rack 44, spring 46 causes the rack to move back towards its original position, thereby causing clamp 14 to return to a closed position against roller 12.

A preferred embodiment of the circuit for the present invention is shown in partial block diagram form in FIG. 5. The optical switch means 24 is shown, and includes LED 28 and detector 30 positioned across air gap 29. The output of the optical switch means 24 is coupled to the counter means 26 and display means 20. In the present embodiment, each digit of the counter means 26 and display means 20 is contained on a single integrated circuit chip. Presently used for this function is the Texas Instrument's TIL 306. Each of these chips thus provides a separate decimal counter for counting up and displaying the count as output by the optical switch means 24. As seen in FIG. 5, the clock input of the least significant digit (LSD) has coupled to it the output of the optical switch means 24. When the LSD digit has counted to its maximum of 10 counts, an output signal is generated on its highest count output line "M". This signal is coupled to the next most significant digit for counting by that digit. Similarly, the maximum count output of this second digit is coupled to the most significant digit (MSD) for counting thereof. Also provided in counter 26 and display 20 are means for suppressing leading zeros. Reference is suggested to Texas Instruments' Optoelectronics Data Book, 4th edition, for further details as to the operation of these decimal digit circuit chips.

Means are also provided for resetting said counter means 26, and thereby said display means 20. This means comprises a manually selectable clear switch 50 shown in FIG. 5, and also indicated in FIGS. 3 and 4. As can be seen in FIG. 4, the switch 50 includes a push button 52, which when manually selected, causes clear switch 50 to output a signal. As seen in the circuit diagram of FIG. 5, when the clear switch 50 is actuated, the reset inputs of all three decimal digits of counter means 26 are grounded, thereby causing the count in said digits to be reset to zero.

Finally, means are also provided in the handle 18 of the apparatus of the present invention for retaining a power source, such as batteries, therein. As seen in the cut-away view of handle 18, illustrated in FIG. 3, a plurality of batteries 60 may be arranged within handle 18 with conventional wiring to an on/off switch 62 providing power thereby in a conventional way to the circuitry of the present invention. A spring means 64 and cap 66 are provided for ease of replacement of batteries 60, said spring 64 further acting as means for improving the electrical contact between adjacent batteries and with the rest of the circuit.

It is to be understood that the foregoing description is merely illustrative of a preferred embodiment of the invention, and the scope of the invention is not to be limited thereto, but is to be determined by the scope of the appended claims.

What is claimed is:

1. A hair length measuring apparatus comprising:
    a body portion including a handle defined at one end thereof;
    a measuring roller operatively attached to said body portion;
    a holding clamp operatively attached to said body portion such that said clamp is adjacent to said roller;
    means for removably biasing said clamp against said roller for holding hair positioned between said clamp and said roller against said roller, such that said roller is caused to rotate when said roller and holding clamp are moved along the length of said hair, said means comprising means for rotating said clamp off of said roller about an axis substantially parallel to the axis of rotation of said roller, to enable hair to be initially positioned between said clamp and said roller;
    means for sensing the rotation of said roller, and for generating output electrical signals in response thereto;
    counter means for counting the occurrence of each said output signal; and
    display means for displaying the present count of said counter means.

2. The hair length measuring apparatus of claim 1, wherein said roller includes a coating of rubber thereon to increase frictional contact of said hair against said roller.

3. The hair length measuring apparatus of claim 1 further comprising manually selectable means for resetting said counter means.

4. The hair length measuring apparatus of claim 1, wherein said means for sensing the rotation of said roller comprises optical switch means including means for detecting an interruption in a light path.

5. The hair length measuring apparatus of claim 4, wherein said optical switch means comprises:
    a u-shaped member including means for transmitting light across an air-gap between the legs of said u-shaped member to a detector on the opposite leg, said air-gap defined in a position such that said roller rotates therein along an axis perpendicular to the path of said transmitted light, said roller defined to include a hole therethrough in a position such that as said roller rotates, the transmitted light is caused to be blocked from reaching said detector at all times except when it is enabled to pass through said hole at least once during each rotation of said roller.

6. A hair length measuring apparatus comprising:
a body portion including a handle defined on one end thereof;
a measuring roller operatively attached to said body portion;
a holding clamp operatively attached to said body portion such that said clamp is adjacent to said roller, for holding hair being measured against said roller, to thereby cause said roller to rotate when said roller and holding clamp are moved along the length of said hair;
means for sensing the rotation of said roller and for generating output electrical signals in response thereto;
counter means for counting the occurrence of each said output signal;
display means for displaying the present count of said counter means; and
means for modifying the position of said holding clamp to enable hair to be initially positioned between said clamp and said roller, said position modifying means comprising:
a pinion gear defined on said clamp;
a rack positioned operatively adjacent said pinion gear; and
spring means for biasing said rack such that said holding clamp is biased to normally be in a position in tension against said roller 7. A hair length measuring apparatus comprising:
a body portion including a handle defined thereon;
a measuring roller operatively attached to said body portion;
a holding clamp operatively attached to said body portion and including means for removably biasing said clamp against said roller for holding hair being measured against said roller, such that as the roller and holding clamp are moved along the length of said hair, said roller is caused to rotate thereby, said means comprising means for rotating said clamp off of said roller about an axis substantially parallel to the axis of rotation of said roller, to enable hair to be initially positioned between said clamp and said roller;
optical switch means for sensing the rotation of said roller;
counter means responsive to said optical switch means for counting the extent of rotation of said roller; and
display means for displaying the present count of said counter means.

8. A method for measuring the length of hair, utilizing a hair length measuring device including a portable body portion having a roller and clamp operatively attached thereto, said clamp normally in tension against said roller, comprising the steps of:
(a) causing said clamp to be removed from contact with said roller about an axis substantially parallel to the axis of rotation of said roller;
(b) operatively positioning hair to be measured between said roller and said clamp;
(c) causing said clamp to return to its position in tension against said roller, thereby frictionally engaging said hair thereto;
(d) causing said hair to be moved across said roller such that said roller is caused to rotate thereby;
(e) sensing said rotation; and
(f) outputting a visual display indicating the present amount of such sensed rotation.

9. A hair length measuring apparatus comprising:
a body portion including a handle defined at one end thereof;
a measuring roller operatively attached to said body portion;
a holding clamp operatively attached to said body portion such that said clamp is adjacent to said roller;
means for removably biasing said clamp against said roller for holding hair positioned between said clamp and said roller against said roller, such that said roller is caused to rotate when said roller and said holding clamp are moved along the length of said hair said means for removably biasing said clamp against said roller comprising:
(i) a pinion gear defined on said clamp;
(ii) a manually actuable rack positioned operatively adjacent said pinion gear; and
(iii) spring means for biasing said rack such that said holding clamp is biased to normally be in a position in tension against said roller;
means for sensing the rotation of said roller, and for generating output electrical signals in response thereto;
counter means for counting the occurrence of each output signal; and
display means for displaying the present count of said counter means.

* * * * *

UNITED STATES PATENT AND TRADEMARK OFFICE
CERTIFICATE OF CORRECTION

PATENT NO. : 4,217,695

DATED : August 19, 1980

INVENTOR(S) : Lawrence L. Talarico, Bruce H. Chapman, Ernest J. Oliver

It is certified that error appears in the above-identified patent and that said Letters Patent are hereby corrected as shown below:

Title page   "6444 Garrone Ave." should be --6644 Garrone Ave.--

Title page   "James E. Oliver" should be --Ernest J. Oliver--

Title page   "1013 Via Palma" should be --1043 Via Palma--

Signed and Sealed this

Thirteenth Day of January 1981

[SEAL]

*Attest:*

SIDNEY A. DIAMOND

*Attesting Officer*   *Commissioner of Patents and Trademarks*